Patented June 23, 1942

2,287,227

UNITED STATES PATENT OFFICE 2,287,227

COMPOUND OR ALLOY FOR COATING WELDS

Clinton Bowsher, Lima, Ohio, assignor to The Artkraft Sign Company, Lima, Ohio, a corporation of Ohio No Drawing. Application April 12, 1941, Serial No. 388,493

3 Claims. (Cl. 75—166)

This invention relates to the welding and galvanizing arts, and more particularly to the art of re-galvanizing a welded surface.

There is described in Patent No. 2,224,953, dated December 17, 1940, of which I am one of the joint inventors, an improved method of seam and spot welding galvanized surfaces, in which the surface from which the galvanized layer has been burned off during the welding process is re-coated with a galvanizing material. It is apparent that unless a metal protective layer is immediately applied to the surfaces which are deprived of their original galvanized coating, due to the melting effects of the welding heat, oxidation and corrosion might set in and eventually cause the welded joint to weaken. The coating material is obtained preferably from a cold stick of solder held by hand and rubbed over the welded surface while the latter is still hot from the welding operation. The solder is thus caused to melt solely due to the heat of the weld, and to adhere to those surfaces from which the original galvanized coating has been burned off.

A process of this character has been found to be quite practical, particularly in connection with the manufacture and erection of signboards, marquees and other outdoor structures made of angle iron which has been rendered rust-proof by galvanizing, and in which the structural members are welded together on location. However, the process of re-galvanizing those surfaces from which the original galvanized metal has been removed during the welding operation calls for considerable skill in determining the best way of manipulating the solder stick over the burned surface to lay down a smooth coating of uniform thickness, similar to the original coating. Moreover, when using ordinary low-melting solder which does not contain a flux, the operator must be able to determine from the character of the welding metal and of the structural members as to whether or not a flux is desirable in order to provide the required tenacity of adherence of the re-galvanized coating to the base metal. Flux may also be necessary in certain circumstances to prevent fissures and cracks from forming which might admit a corroding effect through the re-galvanized coating. When a liquid flux is spread over the heated surface the latter is cooled slightly, depending on the skill with which the flux is applied, and this might add to the difficulty of laying down a protective coating from a cold stick of solder.

For the re-coating layer it has been customary to employ solder of the type which consists of tin and lead, but the tin which gives the hardness property to the coating is somewhat expensive, and even though the combination of tin and lead takes on a fairly hard surface upon cooling, nevertheless the surface is not as hard as the original galvanized coating which is composed chiefly of zinc.

The primary object of the present invention is to provide an improved low-melting galvanized material which has none of the disadvantages set forth in connection with ordinary solder and yet which can be applied in cold stick form to a welded surface, employing only the residual heat of the weld.

Another object is to provide a low-melting alloy for re-coating purposes which contains a flux in metal form for promoting the coating quality of the alloy, and which flux does not reduce the temperature of the welded parts during the coating operation.

Still another object is to provide a galvanizing alloy containing a substantial portion of zinc in order to give hardness to the re-coated layer, and yet is capable of being melted from a cold solid state by the residual heat in the region of a welded joint.

A still further object is to provide a galvanizing alloy which when deposited on an area of limited size of a heated metal surface, will readily flow and distribute itself in all directions as a thin continuous layer from the area of limited size.

A more general object is to provide an improved alloy which may be melted by heat of relatively low temperature obtained in any suitable manner, and in which the alloy has the property of tenaciously adhering to any of the base metals, such as iron, steel, etc.

The above objects are attained, in brief, by providing an alloy which replaces part of the tin by a substantial portion of zinc, and which employs bismuth or mercury or both as metal fluxing agents, finally using a carrying agent of lead which serves to distribute the zinc and/or tin throughout the coating layer.

It was pointed out in the prior patent that when two metal structural members, which had been previously galvanized in any suitable and well known manner, were welded together by any one of the well known welding processes such as by arc welding, using a lap, stitch or seam weld, or when employing a resistance weld as in the case of butt joints, the heat of the weld caused the galvanized coating to be burned off for a considerable distance on each side of the weld. The size of the area from which the galproximately 7¼ parts bismuth, approximately 12½ parts tin, approximately ¾ part mercury, and approximately 57½ parts lead.

3. An alloy having a melting point of less than 850° F. and adapted to be spread when applied as a cold stick to a heated metal surface to form a homogeneous coating thereon which tenaciously adheres to the metal surface, said alloy comprising by weight approximately 6½ to 22 parts zinc, 7¼ parts bismuth, 12½ parts tin, ¾ part metallic mercury and 57½ to 73 parts lead.

CLINTON BOWSHER.

3. Continue the stirring and add the tin component at this temperature.

4. Continue the stirring, heating, etc. and when the mixture has again reached 1100° F. the mercury component is added.

5. The molten mixture is now allowed to cool to a temperature of 650° F., which is suitable for pouring, at which time the bismuth component is added.

6. Thereafter the molten mass is poured into molds in 100-pound lots, or shaped in any other suitable manner, for example, by extrusion.

7. Bars approximately 15" long, ½" wide and ¼" thick may be obtained from the 100-pound mass, the above length and size of these bars having been found to be most convenient when rubbing the alloy over a heated surface.

The resulting bar or rod may be applied to the bare spots immediately surrounding the welded joint either directly after the welding operation, while the weld is still hot, or the welding surfaces may be re-heated in any suitable manner such as by an acetylene flame, to melt the end of the bar. In case it is desired to apply the galvanize coating after the metal parts have been reheated, the latter are first allowed to cool preferably to room temperature, but in any case to less than 150° F. at which time, it will be observed that the slag caused by the welding electrode begins to become loosened from the welded surface. The slag layer is conveniently removed by any suitable form of tool such as a wire brush or vibrator.

An analysis of the formula given above will show that the zinc and tin both act as a coating or galvanizing agent, the bismuth and mercury acting as metal fluxes, while the soft lead serves as a carrying agent for distributing the other metals evenly and quickly over the bare spots as the cold metal stick is manipulated. The combination of the zinc and tin produces a protective coating which is practically as hard as the galvanized layer provided on the base metal surface prior to the welding operation. Zinc is considerably less expensive than tin, so that the combination of zinc and tin produces a less expensive alloy than when ordinary solder, which contains no zinc, is employed. Yet the addition of the zinc introduces the highly desirable quality of hardness and durability to the coated layer. The presence of bismuth and mercury promotes the tenacity with which the zinc and tin adhere to the base metal, serving as fluxes in this respect and to some extent causing the metal of the layer to penetrate the surface of the base metal and to embed itself in the latter. The metal layer clings to the base metal with such tenacity as positively to preclude any peeling or other form of separation between the metal and the coating. Thus the coating is practically integral with the base metal and clings to the base metal with even greater tenacity than the original galvanize coating. This is due to the fact that the coating actually penetrates the foundation metal to a considerable extent on account of the high temperatures at which it is applied. In the case of hot-dip galvanizing, the coating is merely surface bonded to the foundation metal because the metal to be galvanized is put into the bath cold and only absorbs the heat from the bath itself. The soft lead component of the alloy which forms the greatest proportion of the compound serves to conduct the other elements quickly to all parts of the bare spot so that not the slightest fissure or crack can form, and the spreading of the metal layer as a thin continuous surface is greatly facilitated.

In case structural elements of heavier gauge are welded together, necessitating higher welding temperatures, it may be desirable to modify the alloy formula to the extent that the zinc component is increased and the lead component is decreased. A rod of this material would be more suitable when re-galvanizing the surface of angle iron of extremely heavy gauge.

*Example II*

100-pound lots.

| | | |
|---|---|---|
| Zinc | pounds | 22 |
| Bismuth | do | 7¼ |
| Block tin | do | 12½ |
| Metallic mercury | ounces | 10 |
| Soft lead | pounds | 57½ |

An alloy of this character melts at approximately 850° F.

In the event that the framework elements are light weight, for example when thin metal plates are welded together, the zinc may be entirely omitted and the poundage of the zinc is added to the lead.

*Example III*

100-pound lots.

| | | |
|---|---|---|
| Bismuth | pounds | 7¼ |
| Block tin | do | 12½ |
| Metallic mercury | ounces | 10 |
| Soft lead | pounds | 79½ |

An alloy of this character melts at approximately 550° F., considerably less than the fusing temperatures of the other examples.

While I have described my invention as constituting an alloy which can be advantageously used in cold stick form for re-coating areas at a welded joint from which the original galvanized coating has been removed, it will be understood that the alloy is not limited to this use. The alloy may be employed as an original galvanized coating, using the hot dip method, or may be employed for applying an original galvanized coating on a base metal which has been heated in any suitable manner, and using the alloy in cold stick form. In all of these cases the alloy will distribute itself quickly and evenly over the base metal without the slightest fissure or crack, and will stick so tenaciously to the metal as to constitute practically an integral part thereof.

The alloy, when cast in plate form, may be used as the anode of a plating bath for electrolytically applying a protective coating to a foundation metal.

Another use for the improved alloy is in connection with a metal gun for coating and spraying purposes, in which case the alloy would be extruded in wire form for introduction into the gun.

It will be understood that I desire to comprehend within my invention such modifications as come within the scope of the claims and the invention.

Having thus fully described my invention, what I claim as new and desire to secure by Letters Patent, is:

1. A galvanizing compound comprising by weight approximately 6½ parts zinc, approximately 7¼ parts bismuth, approximately 12½ parts tin, approximately ¾ part mercury, and approximately 73 parts lead.

2. A compound for coating purposes comprising by weight approximately 22 parts zinc, approximately 7¼ parts bismuth, approximately 12½ parts tin, approximately ¾ part mercury, and approximately 57½ parts lead.

3. An alloy having a melting point of less than 850° F. and adapted to be spread when applied as a cold stick to a heated metal surface to form a homogeneous coating thereon which tenaciously adheres to the metal surface, said alloy comprising by weight approximately 6½ to 22 parts zinc, 7¼ parts bismuth, 12½ parts tin, ¾ part metallic mercury and 57½ to 73 parts lead.

CLINTON BOWSHER.